US008610097B2

(12) United States Patent
Stueven et al.

(10) Patent No.: US 8,610,097 B2
(45) Date of Patent: Dec. 17, 2013

(54) METHOD FOR THE CONTINUOUS PRODUCTION OF WATER-ABSORBENT POLYMER PARTICLES

(75) Inventors: Uwe Stueven, Bad Soden (DE); Rüdiger Funk, Niedernhausen (DE); Matthias Weismantel, Jossgrund-Oberndorf (DE); Filip Mees, Grobbendonk (BE); Koen Deboel, Wilrijk (BE)

(73) Assignee: BASF SE, Ludwigshafen (DE)

( * ) Notice: Subject to any disclaimer, the term of this patent is extended or adjusted under 35 U.S.C. 154(b) by 177 days.

(21) Appl. No.: 12/438,677

(22) PCT Filed: Sep. 24, 2007

(86) PCT No.: PCT/EP2007/060075
§ 371 (c)(1),
(2), (4) Date: Feb. 24, 2009

(87) PCT Pub. No.: WO2008/037674
PCT Pub. Date: Apr. 3, 2008

(65) Prior Publication Data
US 2009/0321664 A1     Dec. 31, 2009

(30) Foreign Application Priority Data
Sep. 25, 2006   (EP) .................................. 06121229

(51) Int. Cl.
G01N 21/00 (2006.01)
G01N 22/00 (2006.01)
G01F 1/58 (2006.01)
B01J 19/12 (2006.01)

(52) U.S. Cl.
USPC .................... 250/573; 250/432 R; 250/492.1; 526/60

(58) Field of Classification Search
USPC ................. 250/573, 492.1, 576, 428, 432 R; 526/60, 59
See application file for complete search history.

(56) References Cited

U.S. PATENT DOCUMENTS

| | | | | | |
|---|---|---|---|---|---|
| 3,278,747 | A | * | 10/1966 | Ohmart ........................... 378/54 |
| 3,524,478 | A | * | 8/1970 | Allenspach et al. ............ 138/111 |
| 3,590,101 | A | * | 6/1971 | McTaggart et al. .............. 24/377 |
| 3,595,078 | A | * | 7/1971 | Beck et al. ................. 73/861.04 |
| 3,620,368 | A | * | 11/1971 | Comis et al. .................... 209/52 |
| 3,719,089 | A | * | 3/1973 | Kelsall et al. ................. 73/865.5 |
| 3,724,720 | A | * | 4/1973 | Bullivant ........................ 222/55 |
| 3,830,776 | A | * | 8/1974 | Carlson et al. .................. 23/218 |
| 3,939,709 | A | * | 2/1976 | Echtler ....................... 73/861.73 |
| 4,007,319 | A | * | 2/1977 | Weisser et al. .................. 526/60 |
| 4,013,550 | A | * | 3/1977 | Weil .................................. 209/9 |
| 4,276,119 | A | * | 6/1981 | Karnis et al. ..................... 162/49 |
| RE30,684 | E | * | 7/1981 | Bullivant ........................ 222/55 |
| 4,314,241 | A | * | 2/1982 | La Plante et al. .............. 340/603 |
| 4,423,623 | A | * | 1/1984 | Ho et al. ...................... 73/61.41 |
| 4,580,684 | A | * | 4/1986 | Bohme et al. .................. 209/549 |
| 4,726,896 | A | * | 2/1988 | Grove et al. ................... 209/166 |
| 4,890,920 | A | * | 1/1990 | Niziolek et al. ............... 356/336 |
| 5,006,227 | A | * | 4/1991 | Behm et al. .................... 209/143 |
| 5,015,843 | A | * | 5/1991 | Seitz et al. ................ 250/227.21 |
| 5,054,966 | A | * | 10/1991 | Filippelli ....................... 406/191 |
| 5,064,582 | A | * | 11/1991 | Sutton et al. ................. 264/37.29 |
| 5,076,965 | A | * | 12/1991 | Guelta et al. ................ 252/408.1 |
| 5,229,487 | A | * | 7/1993 | Tsubakimoto et al. ........ 528/484 |
| 5,350,799 | A | * | 9/1994 | Woodrum et al. ............ 525/54.3 |
| 5,550,537 | A | * | 8/1996 | Perdue ...................... 340/870.01 |
| 5,665,975 | A | * | 9/1997 | Kedar ............................ 250/573 |
| 5,679,907 | A | * | 10/1997 | Ruck ............................ 73/865.5 |
| 5,793,478 | A | * | 8/1998 | Rader et al. ...................... 356/28 |
| 6,013,921 | A | * | 1/2000 | Moller et al. .................. 250/573 |
| 6,025,814 | A | * | 2/2000 | Nelson et al. .................. 343/878 |
| 6,037,783 | A | | 3/2000 | Reich |
| 6,109,097 | A | * | 8/2000 | Conrads et al. .............. 73/61.41 |
| 6,177,983 | B1 | * | 1/2001 | Trainer ........................ 356/28.5 |
| 6,267,575 | B1 | * | 7/2001 | Rooyakkers et al. ......... 425/83.1 |
| 6,300,468 | B1 | * | 10/2001 | Bretz et al. .................... 528/497 |
| 6,327,914 | B1 | * | 12/2001 | Dutton ..................... 73/861.356 |
| 6,475,391 | B2 | * | 11/2002 | Safir et al. ........................ 506/12 |
| 6,565,768 | B1 | * | 5/2003 | Dentler et al. ................. 252/194 |
| 6,618,677 | B1 | * | 9/2003 | Brown ............................ 702/13 |
| 6,713,019 | B2 | * | 3/2004 | Ozasa et al. ................ 422/82.09 |
| 6,776,053 | B2 | * | 8/2004 | Schlosser et al. ......... 73/861.355 |
| 6,809,314 | B2 | * | 10/2004 | Yamada et al. ................ 250/288 |
| 6,809,821 | B2 | * | 10/2004 | Thomasson et al. .......... 356/342 |
| 6,810,718 | B2 | * | 11/2004 | Wilson et al. ................. 73/54.01 |
| 6,988,857 | B2 | * | 1/2006 | Kroemmer et al. ............. 406/34 |
| 7,002,683 | B2 | * | 2/2006 | Eckardt et al. ................ 356/336 |

(Continued)

FOREIGN PATENT DOCUMENTS

DE    1 039 289 B    9/1958
DE    195 04 544 A1    8/1996

(Continued)

OTHER PUBLICATIONS

Buchholz et al., *Modern Superabsorbent Polymer Technology*, Wiley-VCH, 71-103 (1998).
International Search Report and Written Opinion in PCT/EP2007/060075 dated Feb. 25, 2008.
Knopp, Matthew, "In-Line Analyzers Supervise Milling, Sieving at Stockhausen," *Powder and Bulk Engineering Interenational*, May 2002.
Parsum GmbH, "In-line-Partikelmessung für die Prozess-Steuerung," Technical Product Brochure (http://www.parsum.de/page/deutsch/daten/downloads/Flyer_2005_Dt.pdf), 2005.
SWR Engineering, "Solid Flow Feststoff-Durchflussmessung": Technical Product Brochure, Jan. 18, 2005.

*Primary Examiner* — John Lee
(74) *Attorney, Agent, or Firm* — Marshall, Gerstein & Borun LLP

(57) ABSTRACT

A process for continuously preparing water-absorbing polymer beads by determining at least one particulate delivery material mass flow by means of incident electromagnetic waves.

8 Claims, No Drawings

(56) References Cited

U.S. PATENT DOCUMENTS

| | | | |
|---|---|---|---|
| 7,087,885 B1* | 8/2006 | Yamaguchi | 250/222.2 |
| 7,098,409 B2* | 8/2006 | Liang et al. | 177/1 |
| 7,102,133 B2* | 9/2006 | Happel | 250/356.1 |
| 7,145,320 B2* | 12/2006 | Yoshida et al. | 324/71.4 |
| 7,323,696 B2* | 1/2008 | Vann et al. | 250/458.1 |
| 7,391,035 B2* | 6/2008 | Kong et al. | 250/461.1 |
| 7,429,009 B2* | 9/2008 | Nagasawa et al. | 241/3 |
| 7,527,823 B2* | 5/2009 | Tombult-Meyer et al. | 427/197 |
| 7,712,381 B2* | 5/2010 | Allenberg et al. | 73/861.08 |
| 7,738,084 B1* | 6/2010 | Korman et al. | 356/28 |
| 7,776,984 B2* | 8/2010 | Frank | 526/317.1 |
| 2001/0037674 A1* | 11/2001 | Petro et al. | 73/61.52 |
| 2002/0141902 A1* | 10/2002 | Ozasa et al. | 422/82.09 |
| 2004/0242761 A1* | 12/2004 | Dairoku et al. | 524/556 |
| 2005/0001169 A1* | 1/2005 | Happel | 250/356.1 |
| 2006/0073969 A1 | 4/2006 | Torii et al. | |
| 2007/0066754 A1 | 3/2007 | Loeker et al. | |
| 2007/0096039 A1* | 5/2007 | Kapoor et al. | 250/458.1 |
| 2007/0187617 A1* | 8/2007 | Kong et al. | 250/461.1 |
| 2007/0203280 A1* | 8/2007 | Okochi | 524/430 |
| 2007/0260357 A1* | 11/2007 | Issberner et al. | 700/269 |
| 2008/0188586 A1 | 8/2008 | Bruhns et al. | |
| 2009/0025489 A1* | 1/2009 | Christensen et al. | 73/864 |
| 2009/0219529 A1* | 9/2009 | Dietrich et al. | 356/335 |
| 2009/0321664 A1* | 12/2009 | Stueven et al. | 250/492.1 |
| 2010/0016522 A1* | 1/2010 | Stueven et al. | 526/60 |
| 2010/0068520 A1* | 3/2010 | Stueven | 428/402 |
| 2010/0093949 A1* | 4/2010 | Herfert et al. | 525/451 |
| 2010/0206897 A1* | 8/2010 | Herfert et al. | 222/1 |

FOREIGN PATENT DOCUMENTS

| | | |
|---|---|---|
| DE | 199 11 654 C1 | 12/2000 |
| DE | 10334286 B4 | 1/2006 |
| EP | 1 426 157 A1 | 6/2004 |
| EP | 1422257 B1 | 4/2006 |
| WO | WO-96/24838 A1 | 8/1996 |
| WO | WO-2005/122075 A1 | 12/2005 |
| WO | WO-2006/079631 A1 | 8/2006 |

* cited by examiner

METHOD FOR THE CONTINUOUS PRODUCTION OF WATER-ABSORBENT POLYMER PARTICLES

CROSS-REFERENCE TO RELATED APPLICATIONS

This is the U.S. national phase of International Application No. PCT/EP2007/060075, filed Sep. 24, 2007, which claims the benefit of European Patent Application No. 06121229.6, filed Sep. 25, 2006.

The present invention relates to a process for continuously preparing water-absorbing polymer beads by determining at least one particulate delivery material mass flow by means of incident electromagnetic waves.

The preparation of water-absorbing polymer beads is described in the monograph "Modern Superabsorbent Polymer Technology", F. L. Buchholz and A. T. Graham, Wiley-VCH, 1998, pages 71 to 103.

Being products which absorb aqueous solutions, water-absorbing polymers are used to produce diapers, tampons, sanitary napkins and other hygiene articles, but also as water-retaining agents in market gardening.

The properties of the water-absorbing polymers can be adjusted via the degree of crosslinking. With increasing degree of crosslinking, the gel strength rises and the centrifuge retention capacity (CRC) falls.

To improve the use properties, for example saline flow conductivity (SFC) in the diaper and absorbency under load (AUL), water-absorbing polymer beads are generally postcrosslinked. This increases only the degree of crosslinking of the particle surface, which allows absorbency under load (AUL) and centrifuge retention capacity (CRC) to be decoupled at least partly. This postcrosslinking can be performed in aqueous gel phase. However, dried, ground and screened-off polymer beads (base polymer) are preferably coated on the surface with a postcrosslinker, thermally postcrosslinked and dried. Crosslinkers suitable for this purpose are compounds which comprise at least two groups which can form covalent bonds to the carboxylate groups of the hydrophilic polymer.

EP 1 426 157 A1 describes a continuous process for preparing water-absorbing polymer beads. The individual process steps are decoupled by means of buffer vessels. In order to ensure continuous metering into the postcrosslinking, the use of two reservoirs is proposed. The delivery material mass flow into the postcrosslinking is determined via the determination of fill level changes in the reservoirs.

WO 2005/122075 A1 discloses a continuous process for preparing water-absorbing polymer beads, the process being controlled by means of an artificial neuronal network. The use example utilizes the dependence of the centrifuge retention capacity (CRC) on the crosslinker content of the monomer solution to control the centrifuge retention capacity (CRC).

WO 96/24838 A1 describes an optical process for determining a delivery material mass flow, especially for the control of the firing of a vessel with coal dust in coal-fired power stations.

DE 199 11 654 C1 describes a device for determining speed and size of particles.

It was an object of the present invention to provide an improved process for continuously preparing water-absorbing polymer beads. In particular, the process should be notable for a high process stability. Moreover, process disruptions should be detected rapidly.

It was a further object of the present invention to provide a process for continuously preparing water-absorbing polymer beads, which needs few buffer vessels compared to the prior art.

This object has been achieved by a process for continuously preparing water-absorbing polymer beads by determining at least one particulate delivery material mass flow, which comprises radiating electromagnetic waves into a delivery material mass flow flowing with a speed of at least 0.1 m/s.

The water-absorbing polymer beads have a centrifuge retention capacity (CRC) of typically at least 15 g/g, preferably at least 20 g/g, preferentially at least 25 g/g, more preferably at least 30 g/g, most preferably at least 35 g/g. The centrifuge retention capacity (CRC) of the water-absorbing polymer beads is typically less than 60 g/g, the centrifuge retention capacity (CRC) being determined by the EDANA (European Disposables and Nonwovens Association) recommended test method No. 441.2-02 "Centrifuge retention capacity".

The particulate delivery material mass flow which is determined in the process according to the invention may have particle sizes which deviate from the particle size of the target product. It is possible, for example, to determine delivery material mass flows which consist of particles having a diameter of less than 150 μm or of particles having a diameter of above 850 μm. Such particles are typically removed in the process by means of appropriate classifying steps and preferably recycled into the process at another point. However, it is also possible to determine delivery material mass flows which consist of particles other than water-absorbing polymers, for example fumed silica with primary particles having a mean diameter of approx. 10 nm.

The determination of the delivery material mass flow means that the mass transported per unit time with the delivery material mass flow is determined.

The wavelength of the electromagnetic radiation is subject to no restriction. However, laser diodes can be used advantageously as the radiation source. The wavelength of the radiation emitted by the laser diodes is preferably from 0.5 to 50 μm (from 6 to 600 THz). However, it is also possible to use microwaves as the electromagnetic radiation, the wavelength being preferably from 1 to 10 mm (from 30 to 300 GHz).

The delivery material mass flow can be determined, for example, by virtue of the incident electromagnetic waves being diffracted by the particles of the delivery material mass flow. With the aid of the diffraction, the particle size and the particle speed can be determined by means of a photodetector, as described in DE 199 11 654 C1. For this purpose, laser diodes are preferably used as the radiation source. Such determinations can be performed, for example, with the Parsum® IPP 50 instrument (from Malvern Instruments GmbH, Herrenberg, Germany). The delivery material mass flow can be calculated from particle size and particle speed.

In addition, the delivery material mass flow can be determined by virtue of the incident electromagnetic waves being reflected by the particles of the delivery material mass flow. Subsequently, the reflected electromagnetic waves are evaluated with regard to their frequency and amplitude, as described, for example, in WO 96/24838 A1. For this purpose, preference is given to using microwaves. Such determinations can be performed, for example, with the SolidFlow instrument (from SWR engineering Messtechnik GmbH, Schliengen, Germany).

In the case of tube diameters of more than 20 cm, 2 or 3 sensors are used advantageously, in which case the sensors should be arranged at 90° and 120° respectively with respect to one another.

The sensors are calibrated before operation is commenced, preference being given to using at least three delivery material mass flows in order to recognize nonlinear behavior.

The speed of the delivery material mass flow during the irradiation is preferably at least 1 m/s, preferentially at least 5 m/s, more preferably at least 10 m/s, most preferably at least 12 m/s. Speeds of more than 40 m/s are less advantageous owing to the associated increased mechanical stress.

The delivery material mass flow is typically delivered in tubes with a cylindrical cross section; preference is given to using stainless steel. The delivery material mass flow can be delivered pneumatically and/or gravimetrically.

The delivery material mass flow preferably at least partly comprises water-absorbing polymer beads. The water content of the delivered water-absorbing polymer beads is preferably from 0.1 to 10% by weight, more preferably from 0.5 to 8% by weight, most preferably from 1 to 5% by weight, the water content being determined by the EDANA (European Disposables and Nonwovens Association) recommended test method No. 430.2-02 "Moisture content".

The delivery material mass flow is typically determined continuously. This means that every mass delivered per unit time with the delivery material mass flow is determined, excluding unplanned disruptions.

The optimal initial gas rate in the pneumatic delivery depends upon the diameter of the delivery line. This dependence is best described with the Froude number:

$$Fr = \frac{v}{\sqrt{D \times g}}$$

Fr Froude number
v Gas rate
D Inner diameter of the transport line
g Acceleration due to gravity The Froude number in the inventive pneumatic delivery is preferably from 10 to 40, more preferably from 11 to 30, most preferably from 12 to 20.

At excessively low delivery rates, the pneumatic delivery becomes unstable, and relatively high delivery rates increase the undesired attrition owing to rising mechanical stress.

The delivery material loading of the pneumatic delivery is preferably from 0.5 to 20 kg/kg, more preferably from 1 to 10 kg/kg, most preferably from 2 to 6 kg/kg, the delivery material loading being the quotient of delivery material mass flow and gas mass flow.

In principle, the optimal initial gas rate also increases with rising delivery material loading.

The diameter of the pipeline in which the pneumatic delivery is carried out is preferably from 3 to 30 cm, more preferably from 4 to 25 cm, most preferably from 5 to 20 cm. Excessively low tube diameters lead to a higher mechanical stress as a result of the pneumatic delivery and hence promote the undesired attrition. Excessively large tube diameters enable an equally undesired settling of the water-absorbing polymer beads in the delivery line.

The process according to the invention enables high process stability in the preparation of water-absorbing polymers and rapid detection of process disruptions.

Sudden changes are often an indication of process disruptions. For example, the screening machines used in the classification processes used can be monitored. A rapid rise in a delivery material mass flow then indicates a screen fracture. The rapid recognition of the process disruption minimizes the amount of off-spec product.

In addition, blockages and/or screen overloads in the classification processes can result in a creeping shift in the proportions of the individual screen fractions. These disruptions lead to a reduced separating efficiency of the classification and can be recognized at an early stage by timely determination of the delivery material mass flows by the process according to the invention.

The determination of the delivery material mass flow can also be used for the adjustment of target values in closed-loop controllers. Examples thereof are the regulation of the gas mass flow in the pneumatic delivery, the control of the heating temperature in the afterdrying and the control of the amount of crosslinker in the polymerization with simultaneous recycling of undersize (fines). The examples are illustrated below:

water-absorbing polymer beads are preferably transported by means of pneumatic delivery systems, for which a distinction can be drawn in principle between three delivery types.

In the case of aerial delivery and stream delivery in the region of high gas rates, the laws of the free-flowing individual particle apply approximately. This is the classical type of pneumatic delivery. No product deposits whatsoever occur. There is essentially uniform delivery material distribution in the tube.

When the gas rate falls, the delivery moves into the range of strand delivery, where the delivery material flows in the lower half of the tube in particular. In the upper half of the tube, there is aerial delivery.

At low gas rates, the delivery proceeds extremely gently as dense stream delivery (plug delivery, impulse delivery) with high pressure drop.

High delivery rates increase the mechanical stress on the water-absorbing polymer beads and lead to undesired attrition. Preference is therefore given to low delivery rates.

Excessively low delivery rates in the range of strand delivery are, though, problematic, since stable delivery is not possible in the unstable range between dense stream delivery and strand delivery. Instead, the mechanical stresses which occur can lead to severe damage to the delivery system, up to and including tearing of the delivery lines out of the mounts.

Excessively low delivery rates can occur, for example, when the delivery material mass flow rises owing to nonuniform loading of the pneumatic delivery system and the gas mass flow is not raised sufficiently.

The process according to the invention now enables the timely determination of the actual delivery material mass flow actually in the foremost region of the delivery line. This enables rapid adjustment of the gas mass flow. This makes possible a smaller safety interval from the unstable region, and the pneumatic delivery can be operated at relatively low delivery rates. Undesired attrition can be minimized.

The process according to the invention can also be used to control the heating temperature in the afterdrying.

Typically, the hydrogel obtained in the polymerization is dried on a belt drier. After the drying, incompletely dried fractions are removed, as described, for example, in EP 948 997 A2. The incompletely dried fractions can be afterdried in a separate drier.

The amount of incompletely dried fractions is subject to significant variations. It is therefore advantageous to collect these varying amounts by means of a reservoir vessel.

The timely determination of the delivery material mass flow in the process according to the invention allows the drier output of the afterdrying to be adjusted optimally; a reservoir vessel is no longer required.

However, the process according to the invention can also be used to control the amount of crosslinker in the polymerization with simultaneous recycling of undersize (fines).

In the preparation of water-absorbing polymer beads, classification is effected both after the grinding and after the postcrosslinking. This removes undersize (fines). It is advisable to recycle this undersize (fines) for economic reasons. The undersize (fines) obtained both after the grinding and after the postcrosslinking is preferably stored intermediately in a common silo and recycled into the polymerization.

It has now been found that recycled postcrosslinked undersize lowers the centrifuge retention capacity (CRC) of the end product. It is therefore necessary to adjust the amount of crosslinker in the polymerization according to the amount of recycled postcrosslinked undersize (fines). The process according to the invention is particularly suitable for this purpose. The timely determination of the recycled delivery material mass flows of undersize (fines) allows the proportion of postcrosslinked undersize (fines) in the recycled mixture to be calculated directly, and the amount of crosslinker in the polymerization to be adjusted.

Advantageously, this measurement unit is used simultaneously for the screen monitoring already described above, which allows the number of measurement devices in the process to be kept low.

The water-absorbing polymer beads to be used in the process according to the invention can be prepared by polymerizing monomer solutions comprising at least one ethylenically unsaturated monomer a), optionally at least one crosslinker b), at least one initiator c) and water d).

The monomers a) are preferably water-soluble, i.e. the solubility in water at 23° C. is typically at least 1 g/100 g of water, preferably at least 5 g/100 g of water, more preferably at least 25 g/100 g of water, most preferably at least 50 g/100 g of water, and preferably have at least one acid group each.

Suitable monomers a) are, for example, ethylenically unsaturated carboxylic acids such as acrylic acid, methacrylic acid, maleic acid, fumaric acid and itaconic acid. Particularly preferred monomers are acrylic acid and methacrylic acid. Very particular preference is given to acrylic acid.

The preferred monomers a) have at least one acid group, the acid groups preferably having been at least partly neutralized.

The proportion of acrylic acid and/or salts thereof in the total amount of monomers a) is preferably at least 50 mol %, more preferably at least 90 mol % and most preferably at least 95 mol %.

The monomers a), especially acrylic acid, comprise preferably up to 0.025% by weight of a hydroquinone monoether. Preferred hydroquinone monoethers are hydroquinone monomethyl ether (MEHQ) and/or tocopherols.

Tocopherol is understood to mean compounds of the following formula

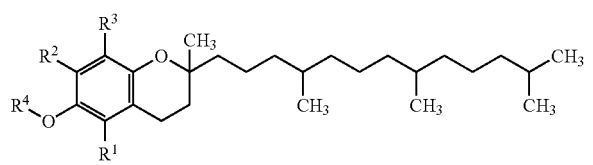

where $R^1$ is hydrogen or methyl, $R^2$ is hydrogen or methyl, $R^3$ is hydrogen or methyl, and $R^4$ is hydrogen or an acyl radical having from 1 to 20 carbon atoms.

Preferred radicals for $R^4$ are acetyl, ascorbyl, succinyl, nicotinyl and other physiologically compatible carboxylic acids. The carboxylic acids may be mono-, di- or tricarboxylic acids.

Preference is given to alpha-tocopherol where $R^1=R^2=R^3=$methyl, in particular racemic alpha-tocopherol. $R^1$ is more preferably hydrogen or acetyl. RRR-alpha-tocopherol is especially preferred.

The monomer solution comprises preferably at most 130 ppm by weight, more preferably at most 70 ppm by weight, preferably at least 10 ppm by weight, more preferably at least 30 ppm by weight, in particular around 50 ppm by weight, of hydroquinone monoether, based in each case on acrylic acid, acrylic acid salts also being considered as acrylic acid. For example, the monomer solution can be prepared by using an acrylic acid having an appropriate content of hydroquinone monoether.

Crosslinkers b) are compounds having at least two free-radically polymerizable groups which can be polymerized by a free-radical mechanism into the polymer network. Suitable crosslinkers b) are, for example, ethylene glycol dimethacrylate, diethylene glycol diacrylate, allyl methacrylate, trimethylolpropane triacrylate, triallylamine, tetraallyloxyethane, as described in EP 530 438 A1, di- and triacrylates, as described in EP 547 847 A1, EP 559 476 A1, EP 632 068 A1, WO 93/21237 A1, WO 2003/104299 A1, WO 2003/104300 A1, WO 2003/104301 A1 and in DE 103 31 450 A1, mixed acrylates which, as well as acrylate groups, comprise further ethylenically unsaturated groups, as described in DE 103 31 456 A1 and DE 103 55 401 A1, or crosslinker mixtures, as described, for example, in DE 195 43 368 A1, DE 196 46 484 A1, WO 90/15830 A1 and WO 2002/32962 A2.

Suitable crosslinkers b) are in particular N,N'-methylenebisacrylamide and N,N'-methylenebismethacrylamide, esters of unsaturated mono- or polycarboxylic acids of polyols, such as diacrylate or triacrylate, for example butanediol diacrylate, butanediol dimethacrylate, ethylene glycol diacrylate or ethylene glycol dimethacrylate, and also trimethylolpropane triacrylate and allyl compounds such as allyl (meth)acrylate, triallyl cyanurate, diallyl maleate, polyallyl esters, tetraallyloxyethane, triallylamine, tetraallylethylenediamine, allyl esters of phosphoric acid and vinylphosphonic acid derivatives, as described, for example, in EP 343 427 A2. Further suitable crosslinkers b) are pentaerythritol diallyl ether, pentaerythritol triallyl ether and pentaerythritol tetraallyl ether, polyethylene glycol diallyl ether, ethylene glycol diallyl ether, glycerol diallyl ether and glycerol triallyl ether, polyallyl ethers based on sorbitol, and ethoxylated variants thereof. In the process according to the invention, it is possible to use di(meth)acrylates of polyethylene glycols, the polyethylene glycol used having a molecular weight between 100 and 1000.

However, particularly advantageous crosslinkers b) are di- and triacrylates of 3- to 20-tuply ethoxylated glycerol, of 3- to 20-tuply ethoxylated trimethylolpropane, of 3- to 20-tuply ethoxylated trimethylolethane, in particular di- and triacrylates of 2- to 6-tuply ethoxylated glycerol or of 2- to 6-tuply ethoxylated trimethylolpropane, of 3-tuply propoxylated glycerol or of 3-tuply propoxylated trimethylolpropane, and also of 3-tuply mixed ethoxylated or propoxylated glycerol or of 3-tuply mixed ethoxylated or propoxylated trimethylolpropane, of 15-tuply ethoxylated glycerol or of 15-tuply ethoxylated trimethylolpropane, and also of 40-tuply ethoxylated glycerol, of 40-tuply ethoxylated trimethylolethane or of 40-tuply ethoxylated trimethylolpropane.

Very particularly preferred crosslinkers b) are the polyethoxylated and/or -propoxylated glycerols which have been esterified with acrylic acid or methacrylic acid to give di- or triacrylates, as described, for example, in WO 2003/104301 A1. Di- and/or triacrylates of 3- to 10-tuply ethoxylated glycerol are particularly advantageous. Very particular preference is given to di- or triacrylates of 1- to 5-tuply ethoxylated and/or propoxylated glycerol. Most preferred are the triacrylates of 3- to 5-tuply ethoxylated and/or propoxylated glycerol.

The amount of crosslinkers b) is preferably from 0.01 to 5% by weight, more preferably from 0.05 to 2% by weight, most preferably from 0.1 to 1% by weight, based in each case on the monomer solution.

The initiators c) used may be all compounds which disintegrate into free radicals under the polymerization conditions, for example peroxides, hydroperoxides, hydrogen peroxide, persulfates, azo compounds and redox initiators. Preference is given to the use of water-soluble initiators. In some cases, it is advantageous to use mixtures of various initiators, for example mixtures of hydrogen peroxide and sodium or potassium peroxodisulfate. Mixtures of hydrogen peroxide and sodium peroxodisulfate can be used in any proportion.

Particularly preferred initiators c) are azo initiators such as 2,2'-azobis[2-(2-imidazolin-2-yl)propane]dihydrochloride and 2,2'-azobis[2-(5-methyl-2-imidazolin-2-yl)propane]dihydrochloride, and photoinitiators such as 2-hydroxy-2-methylpropiophenone and 1-[4-(2-hydroxyethoxy)phenyl]-2-hydroxy-2-methyl-1-propan-1-one, redox initiators such as sodium persulfate/hydroxymethylsulfinic acid, ammonium peroxodisulfate/hydroxymethylsulfinic acid, hydrogen peroxide/hydroxymethylsulfinic acid, sodium persulfate/ascorbic acid, ammonium peroxodisulfate/ascorbic acid and hydrogen peroxide/ascorbic acid, photoinitiators such as 1-[4-(2-hydroxyethoxy)-phenyl]-2-hydroxy-2-methyl-1-propan-1-one, and mixtures thereof.

The initiators are used in customary amounts, for example in amounts of from 0.001 to 5% by weight, preferably from 0.01 to 1% by weight, based on the monomers a).

For optimal action, the preferred polymerization inhibitors require dissolved oxygen. Therefore, the monomer solution can be freed of dissolved oxygen before the polymerization by inertization, i.e. flowing through with an inert gas, preferably nitrogen. The oxygen content of the monomer solution is preferably lowered before the polymerization to less than 1 ppm by weight, more preferably to less than 0.5 ppm by weight.

The preparation of a suitable polymer and also further suitable hydrophilic ethylenically unsaturated monomers a) are described in DE 199 41 423 A1, EP 686 650 A1, WO 2001/45758 A1 and WO 2003/104300 A1.

Suitable reactors are kneading reactors or belt reactors. In the kneader, the polymer gel formed in the polymerization of an aqueous monomer solution is comminuted continuously by, for example, contrarotatory stirrer shafts, as described in WO 2001/38402 A1. The polymerization on the belt is described, for example, in DE 38 25 366 A1 and U.S. Pat. No. 6,241,928. Polymerization in a belt reactor forms a polymer gel which has to be comminuted in a further process step, for example in a meat grinder, extruder or kneader.

Advantageously, the hydrogel, after leaving the polymerization reactor, is then stored, for example in insulated vessels, at elevated temperature, preferably at least 50° C., more preferably at least 70° C., most preferably at least 80° C., and preferably less than 100° C. The storage, typically for from 2 to 12 hours, further increases the monomer conversion.

In the case of relatively high monomer conversions in the polymerization reactor, the storage can also be shortened significantly or a storage can be dispensed with.

The acid groups of the resulting hydrogels have typically been partially neutralized, preferably to an extent of from 25 to 95 mol %, more preferably to an extent of from 50 to 80 mol % and even more preferably to an extent of from 60 to 75 mol %, for which the customary neutralizing agents can be used, preferably alkali metal hydroxides, alkali metal oxides, alkali metal carbonates or alkali metal hydrogencarbonates and also mixtures thereof. Instead of alkali metal salts, it is also possible to use ammonium salts. Particularly preferred alkali metals are sodium and potassium, but very particular preference is given to sodium hydroxide, sodium carbonate or sodium hydrogencarbonate and also mixtures thereof.

Neutralization is preferably carried out at the monomer stage. It is done typically by mixing in the neutralizing agent as an aqueous solution, as a melt, or else preferably as a solid material. For example, sodium hydroxide having a water content of distinctly below 50% by weight can be present as a waxy mass having a melting point of above 23° C. In this case, metering as piece material or melt at elevated temperature is possible.

However, it is also possible to carry out neutralization after the polymerization, at the hydrogel stage. It is also possible to neutralize up to 40 mol %, preferably from 10 to 30 mol % and more preferably from 15 to 25 mol % of the acid groups before the polymerization by adding a portion of the neutralizing agent to the monomer solution and setting the desired final degree of neutralization only after the polymerization, at the hydrogel stage. When the hydrogel is neutralized at least partly after the polymerization, the hydrogel is preferably comminuted mechanically, for example by means of a meat grinder, in which case the neutralizing agent can be sprayed, sprinkled or poured on and then carefully mixed in. To this end, the gel mass obtained can be repeatedly ground in a meat grinder for homogenization.

The hydrogel is then preferably dried with a belt drier until the residual moisture content is preferably below 15% by weight and especially below 10% by weight, the water content being determined by EDANA (European Disposables and Nonwovens Association) recommended test method No. 430.2-02 "Moisture content". If desired, however, drying can also be carried out using a fluidized bed drier or a heated plowshare mixer. To obtain particularly white products, it is advantageous to dry this gel while ensuring rapid removal of the evaporating water. To this end, the drier temperature must be optimized, the air feed and removal has to be controlled, and sufficient venting must be ensured in each case. The higher the solids content of the gel, the simpler the drying, by its nature, and the whiter the product. The solids content of the gel before the drying is therefore preferably between 30% and 80% by weight. It is particularly advantageous to vent the drier with nitrogen or another nonoxidizing inert gas. If desired, however, it is also possible simply just to lower the partial pressure of the oxygen during the drying in order to prevent oxidative yellowing processes.

Thereafter, the dried hydrogel is ground and classified, and the apparatus used for grinding may typically be single- or multistage roll mills, preferably two- or three-stage roll mills, pin mills, hammer mills or vibratory mills.

The mean particle size of the polymer beads removed as the product fraction is preferably at least 200 µm, more preferably from 250 to 600 µm, very particularly from 300 to 500 µm. The mean particle size of the product fracton may be determined by means of the EDANA (European Disposables and Nonwovens Association) recommended test method No. 420.2-02 "Particle size distribution", where the proportions by mass of the screen fractions are plotted in cumulated form and the mean particle size is determined graphically. The mean particle size here is the value of the mesh size which gives rise to a cumulative 50% by weight.

To further improve the properties, the polymer beads may be postcrosslinked. Suitable postcrosslinkers are compounds which comprise groups which can form covalent bonds with the at least two carboxylate groups of the hydrogel. Suitable compounds are, for example, alkoxysilyl compounds, polyaziridines, polyamines, polyamidoamines, di- or polyepoxides, as described in EP 83 022 A2, EP 543 303 A1 and EP 937 736 A2, di- or polyfunctional alcohols, as described in DE 33 14 019 A1, DE 35 23 617 A1 and EP 450 922 A2, or β-hydroxyalkylamides, as described in DE 102 04 938 A1 and U.S. Pat. No. 6,239,230.

Additionally described as suitable postcrosslinkers are cyclic carbonates in DE 40 20 780 C1, 2-oxazolidone and its derivatives, such as 2-hydroxyethyl-2-oxazolidone, in DE 198 07 502 A1, bis- and poly-2-oxazolidinones in DE 198 07 992 C1, 2-oxotetrahydro-1,3-oxazine and its derivatives in DE 198 54 573 A1, N-acyl-2-oxazolidones in DE 198 54 574 A1, cyclic ureas in DE 102 04 937 A1, bicyclic amide acetals in DE 103 34 584 A1, oxetanes and cyclic ureas in EP 1 199 327 A2 and morpholine-2,3-dione and its derivatives in WO 2003/31482 A1.

In addition, it is also possible to use postcrosslinkers which comprise additional polymerizable ethylenically unsaturated groups, as described in DE 37 13 601 A1.

The amount of postcrosslinker is preferably from 0.01 to 1% by weight, more preferably from 0.05 to 0.5% by weight, most preferably from 0.1 to 0.2% by weight, based in each case on the polymer.

In a preferred embodiment of the present invention, polyvalent cations are applied to the particle surface in addition to the postcrosslinkers.

The polyvalent cations usable in the process according to the invention are, for example, divalent cations such as the cations of zinc, magnesium, calcium and strontium, trivalent cations such as the cations of aluminum, iron, chromium, rare earths and manganese, tetravalent cations such as the cations of titanium and zirconium. Possible counterions are chloride, bromide, sulfate, hydrogensulfate, carbonate, hydrogencarbonate, nitrate, phosphate, hydrogenphosphate, dihydrogenphosphate and carboxylate, such as acetate and lactate. Aluminum sulfate is preferred. Apart from metal salts, it is also possible to use polyamines as polyvalent cations.

The amount of polyvalent cation used is, for example, from 0.001 to 0.5% by weight, preferably from 0.005 to 0.2% by weight, more preferably from 0.02 to 0.1% by weight, based in each case on the polymer.

The postcrosslinking is typically performed in such a way that a solution of the postcrosslinker is sprayed onto the hydrogel or the dry polymer beads. The spraying is followed by thermal drying, and the postcrosslinking reaction can take place either before or during the drying.

The spraying of a solution of the crosslinker is preferably performed in mixers with moving mixing tools, such as screw mixers, paddle mixers, disk mixers, plowshare mixers and shovel mixers. Particular preference is given to vertical mixers, very particular preference to plowshare mixers and shovel mixers. Suitable mixers are, for example, Lödige mixers, Bepex mixers, Nauta mixers, Processall mixers and Schugi mixers.

The thermal drying is preferably carried out in contact driers, more preferably paddle driers, most preferably disk driers. Suitable driers are, for example, Bepex driers and Nara driers. Moreover, it is also possible to use fluidized bed driers.

The drying can be effected in the mixer itself, by heating the jacket or blowing in warm air. Equally suitable is a downstream drier, for example a staged drier, a rotary tube oven or a heatable screw. It is particularly advantageous to mix and dry in a fluidized bed drier.

Preferred drying temperatures are in the range from 100 to 250° C., preferably from 120 to 220° C. and more preferably from 130 to 210° C. The preferred residence time at this temperature in the reaction mixer or drier is preferably at least 10 minutes, more preferably at least 20 minutes, most preferably at least 30 minutes.

Subsequently, the postcrosslinked polymer can be classified again.

The invention claimed is:

1. A process for determining a mass flow of water-absorbing polymer beads, which comprises radiating electromagnetic waves into the water-absorbing polymer bead mass flow after a screening classification, as said polymer bead mass flow is flowing with a speed of at least 0.1 m/s in a tube with a cylindrical cross section, detecting the electromagnetic waves after interaction with the water-absorbing polymer bead mass flow, calculating a value of mass flow per unit time from the detected electromagnetic waves, and correlating the calculated mass flow per unit time to a process disruption in the screening classification.

2. The process according to claim 1, wherein the mass flow of water-absorbing polymer beads is delivered pneumatically.

3. The process according to claim 1, wherein the water-absorbing polymer beads have a water content of less than 10% by weight.

4. The process according to claim 1, wherein the mass flow of water-absorbing polymer beads is determined continuously.

5. The process according to claim 1, wherein the electromagnetic waves are radiated in by means of a diode laser.

6. The process according to claim 1, wherein the electromagnetic waves are microwaves.

7. The process according to claim 1, wherein the water-absorbing polymer beads comprise partly neutralized polymerized acrylic acid to an extent of at least 50 mol %.

8. The process according to claim 1, wherein the water-absorbing polymer beads have a centrifuge retention capacity of at least 15 g/g.

* * * * *